(12) United States Patent
Okamoto et al.

(10) Patent No.: US 6,922,610 B2
(45) Date of Patent: Jul. 26, 2005

(54) ROBOT HAVING OFFSET ROTARY JOINTS

(75) Inventors: Osamu Okamoto, Tokyo (JP);
Teruomi Nakaya, Tokyo (JP); Seizo Suzuki, Tokyo (JP); Isao Yamaguchi, Saitama (JP); Heihachiro Kamimura, Tokyo (JP); Kotaro Matsumoto, Kanagawa (JP); Sachiko Wakabayashi, Tokyo (JP); Shuichi Sasa, Tokyo (JP)

(73) Assignee: National Aerospace Laboratory of Japan, Tokyo (JP)

( * ) Notice: Subject to any disclaimer, the term of this patent is extended or adjusted under 35 U.S.C. 154(b) by 86 days.

(21) Appl. No.: 10/424,711

(22) Filed: Apr. 29, 2003

(65) Prior Publication Data

US 2003/0208303 A1 Nov. 6, 2003

(30) Foreign Application Priority Data

May 2, 2002 (JP) ........................................ 2002-130440

(51) Int. Cl.[7] ............................................. G06F 19/00
(52) U.S. Cl. ........................ 700/245; 700/246; 700/247; 700/260; 318/568.1; 318/568.12; 318/568.2; 318/568.22; 901/9; 901/22; 901/25; 219/121.74; 219/121.84; 701/23
(58) Field of Search ................................. 700/245, 246, 700/247, 260; 318/568.1, 568.12, 568.2, 568.22; 901/9, 22, 25; 219/121.74, 121.84; 701/23

(56) References Cited

U.S. PATENT DOCUMENTS 4,805,477 A * 2/1989 Akeel ...................... 74/490.05
4,907,937 A * 3/1990 Milenkovic ................. 414/735

(Continued)

FOREIGN PATENT DOCUMENTS

| JP | 60-67093 | 4/1985 |
|---|---|---|
| JP | 60-219170 | 11/1985 |
| JP | 61-134885 | 8/1986 |
| JP | 2000-176866 | 6/2000 |
| JP | 2003-25269 | 1/2003 |

OTHER PUBLICATIONS

Nagi et I., Motion control for novel legged robot, 1989, IEEE, pp. 2–7.*
Chen et al., Position error analysis for robot manipulators with all rotary joints, 1996, pp. 1011–1016.*
Olsen et al., Identification of parameters in models of robots with rotary joints, 1045, IEEE, pp. 1045–1049.*
Nagy et al., Motion control for a novel legged robot, 1989, IEEE, pp. 2–7.*
Ueno et al., On control and planning of a space station robot walker, 1990, IEEE, pp. 220–223.*

Primary Examiner—Thomas G. Black
Assistant Examiner—McDieunel Marc
(74) Attorney, Agent, or Firm—Westerman, Hattori, Daniels & Adrian, LLP

(57) ABSTRACT

A robot is obtained having various functions that are demanded for planetary landing vehicles, extreme operations robots or the like, in particular to provide a leg structure for a robot that is capable of getting up itself when overturned, facilitating take-off and landing on uneven ground, and that has a walking function and that has a hand function capable of three-dimensional operation. A robot comprises a main robot body and at least three legs mounted on this main body for enabling three-dimensional movement of the main robot body such as a self-erecting action or walking action; each leg is constituted by a multi-joint arm having a plurality of said offset rotary joints linked together and has a ground-engaging member mounted at the leading end of the arm, so that each leg is capable of independently controlled three-dimensional movement and drive.

17 Claims, 11 Drawing Sheets

U.S. PATENT DOCUMENTS

| | | | |
|---|---|---|---|
| 5,193,963 A | * 3/1993 | McAffee et al. | 414/5 |
| 5,293,107 A | * 3/1994 | Akeel | 318/568.11 |
| 5,355,743 A | * 10/1994 | Tesar | 74/490.03 |
| 6,408,224 B1 | * 6/2002 | Okamoto et al. | 700/245 |
| 6,430,475 B2 | 8/2002 | Okamoto et al. | |
| 6,668,211 B1 | * 12/2003 | Fujita et al. | 700/245 |
| 6,671,582 B1 | * 12/2003 | Hanley | 700/245 |
| 6,684,127 B2 | * 1/2004 | Fujita et al. | 700/245 |
| 6,711,469 B2 | * 3/2004 | Sakamoto et al. | 700/245 |
| 6,728,598 B2 | * 4/2004 | Fujita et al. | 700/245 |
| 6,760,646 B2 | * 7/2004 | Osawa | 700/245 |
| 6,785,590 B2 | * 8/2004 | Kasuga et al. | 700/245 |

* cited by examiner

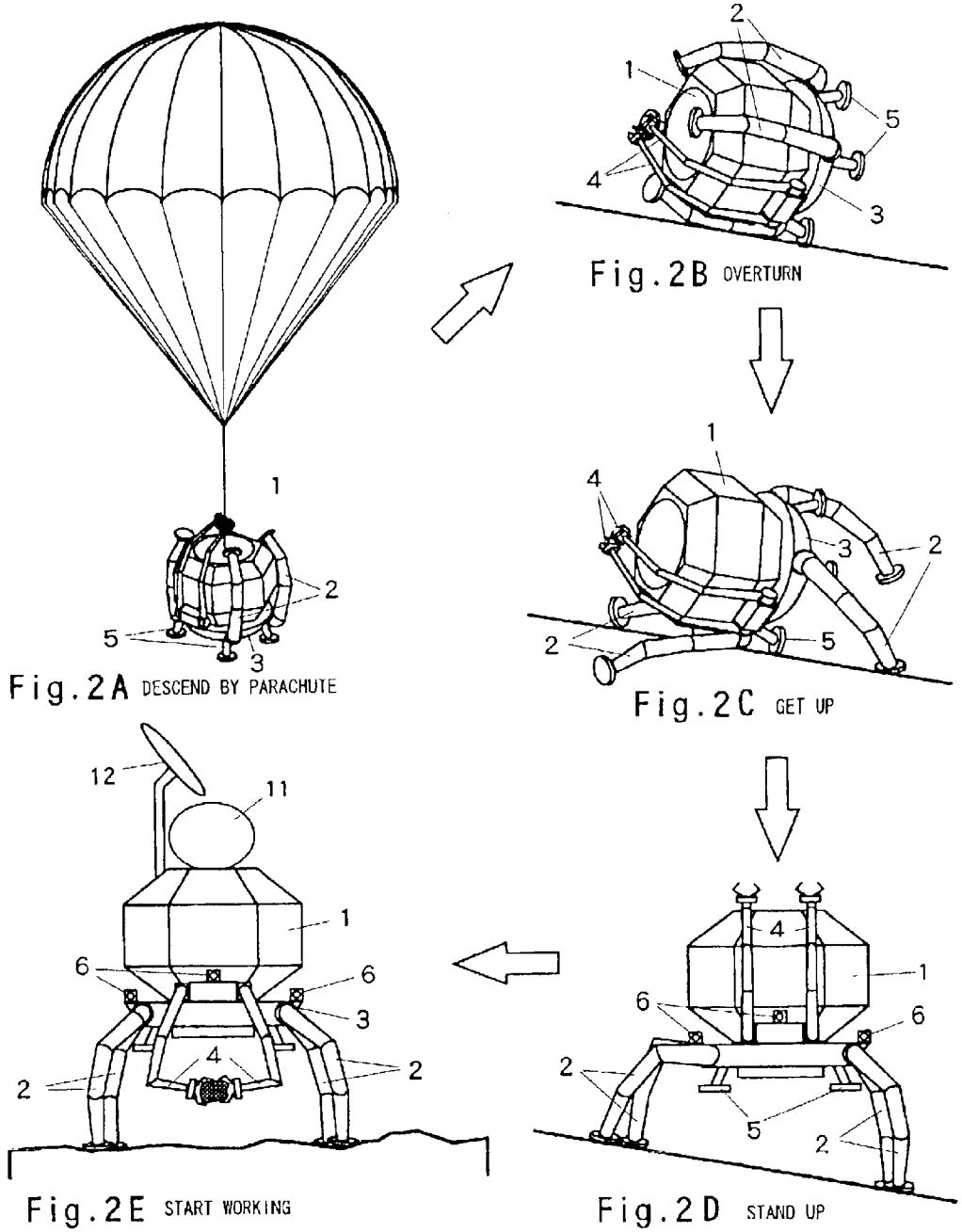
Fig. 2A DESCEND BY PARACHUTE
Fig. 2B OVERTURN
Fig. 2C GET UP
Fig. 2D STAND UP
Fig. 2E START WORKING

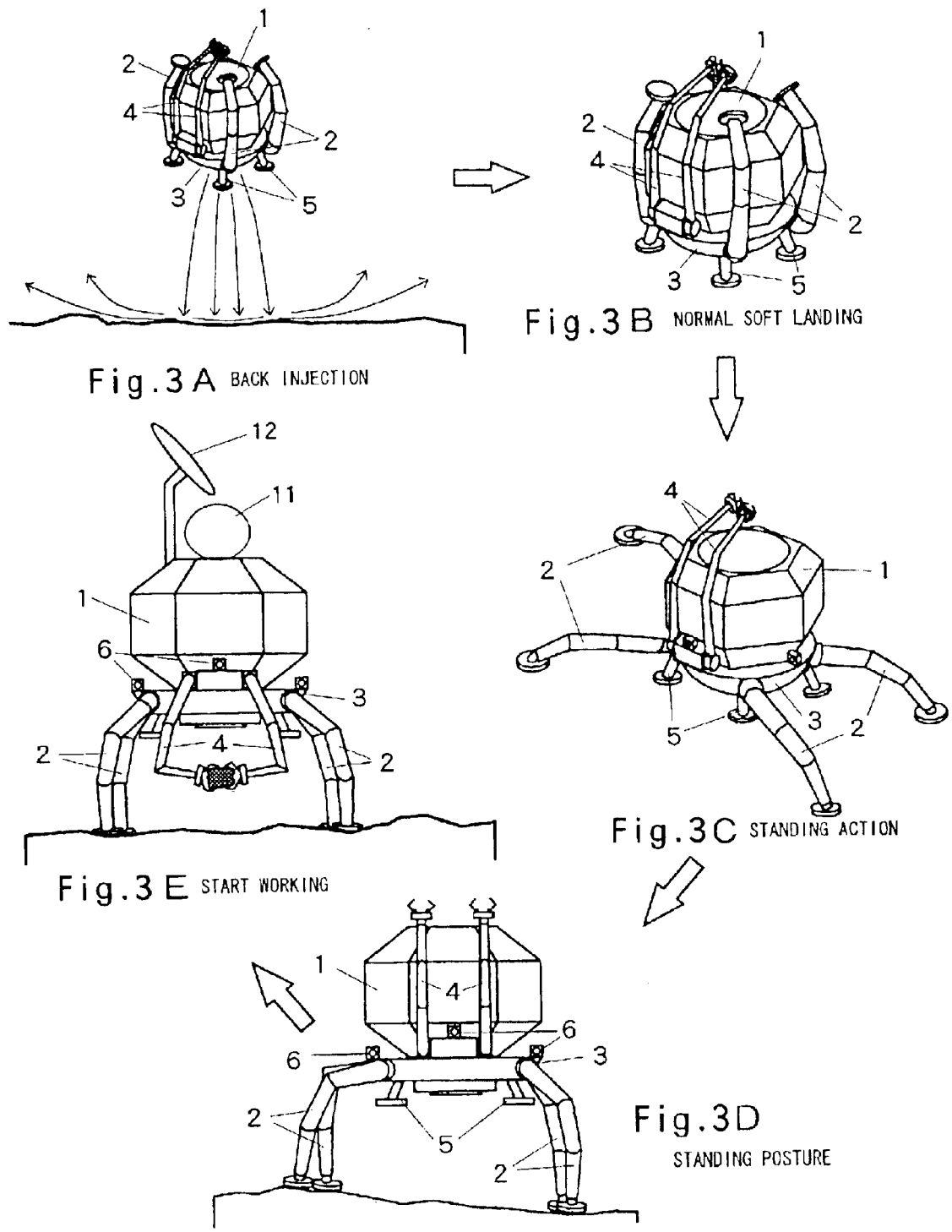

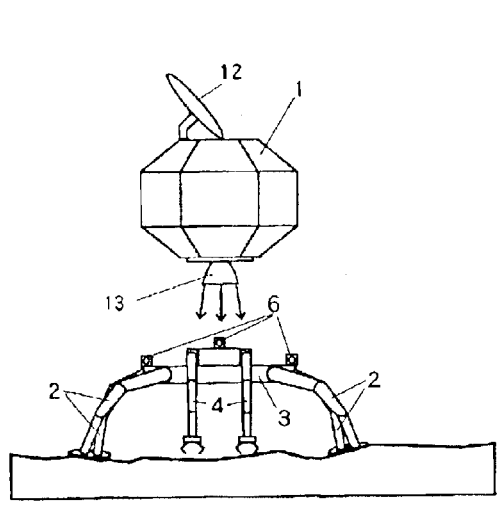
Fig.4A RETURN MODE 1 (ON GOOD FOOTING)
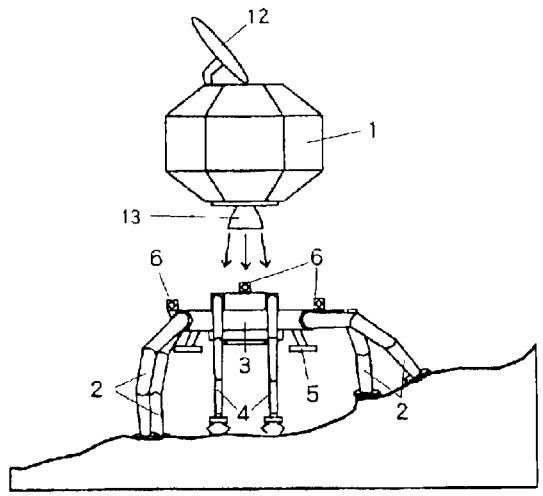
Fig.4B RETURN MODE 2 (ON ADVERSE FOOTING)
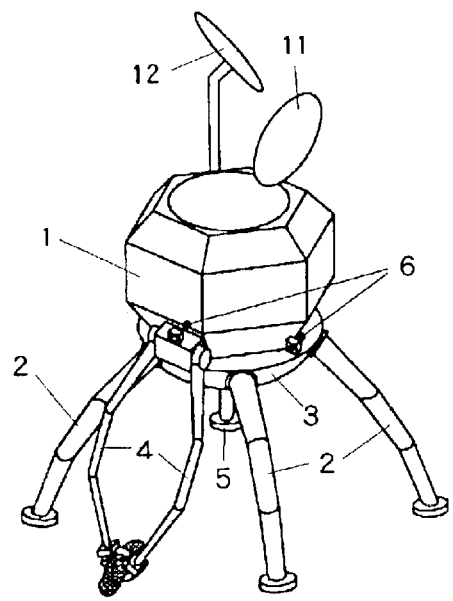
Fig.5A RIGHT GOODS
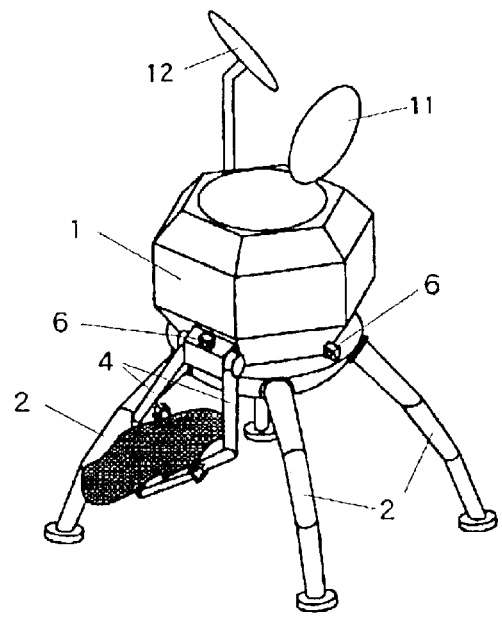
Fig.5B HEAVY WEIGHT GOODS

WALLKING TRANSFER MODE ( SHOCK ABSOBED TIRE BE USED AS FOOT )

WALLKING TRANSFER MODE ( SHOCK ABSOBED TIRE BE USED AS FOOT )

Fig. 9    WORKING ON THE EARTH

OFFSET ROTARY JOINT UNIT ( ONE UNIT )

ROBOT HAVING OFFSET ROTARY JOINTS

BACKGROUND OF THE INVENTION

1. Field of the Invention

The present invention relates to a leg mechanism for a robot and in particular relates to a leg mechanism for a planetary exploration robot or extreme operations robot comprising a plurality of legs that are capable of three-dimensional movement and are capable of being independently driven and controlled, which is capable of self-righting when overturned and which facilitates take-off and landing on uneven ground.

2. Description of the Related Art

Since in many cases the shape condition of the surface is unknown when landing on the surface of the moon, Mars or other planets, it may be assumed that a planetary landing vehicle used to land on for example the lunar surface and collect surface materials etc may be unable to maintain its normal posture and may overturn on landing. Also, when returning, it is considered to be necessary to support the return vehicle in the normal posture for purposes of the rocket jet. If the landing vehicle is regarded as an unmanned robot, it is required that the legs of this robot should be multi-functional legs (arms) that are capable not merely of being employed during landing and take-off but also, due to the need for weight reduction, of also serving for walking, running and handling operations. More specifically, functions that would ideally be demanded include a function of being able to right itself under its own power after being overturned, the ability to walk, the ability to run with wheels, the ability to mitigate the impact of landing, the ability to function as hands during collection of materials or other operations, the ability to hold heavy objects, the ability to maintain posture, the ability to freely direct a camera or sensor mounted on these legs in a desired direction and a self-repairing or compensating function in the event of malfunction. Apart from planetary exploration as described above, a robot having these functions could also be applied terrestrially as an extreme operations robot etc for performing taks and/or recovery in dangerous topography which it is difficult for human beings to enter directly, caves, deserts, volcanoes, the poles or under the sea or at the seabed. However, such a multi-functional robot has conventionally not yet been proposed.

SUMMARY OF THE INVENTION

An object of the present invention is to provide a robot leg structure whereby a robot may be obtained having the aforementioned functions that are demanded for planetary landing vehicles etc or extreme operations robots etc and in particular that is capable of righting itself when overturned and whereby take-off and landing on uneven ground is facilitated, that has a walking function and that has a hand function capable of three-dimensional operation.

A robot having offset rotary joints according to the present invention comprises a main robot body and at least three legs mounted on this main body for enabling three-dimensional movement of the main robot body such as a self-erecting action or walking action; each leg comprising a multi-joint arm in which a plurality of offset rotary joints are linked and having a ground-engaging member mounted at its leading end, each leg being capable of independently controlled three-dimensional movement and drive.

Also, in order to perform operations such as grasping objects, raising them and moving them, a robot having offset rotary joints according to the present invention comprises at least two legs having a hand function, on which are mounted a multi-joint arm constituted by linking a plurality of offset rotary joints and a finger member comprising a gripping function at the leading end of this arm.

In order to confer a running function, a robot having offset rotary joints according to the present invention is of a construction in which a rotary drive source is arranged on the outer arm of each leg, a wheel being mounted by means of bearings and a rotary shaft at the leading end of this arm, said rotary shaft being held in a transverse condition by an offset joint and the wheel being rotated by said drive source.

In a robot having offset rotary joints according to the present invention, in order to improve convenience of operation, a video camera and/or distance sensor are mounted on the robot and the information obtained from these is utilized for control of the multi-joint arm in which a plurality of offset rotary joints are linked.

In a robot having offset rotary joints according to the present invention, the wheels or ground-engaging members at the leading ends of the legs may be made of a shock-absorbing construction in order to protect the robot from impact when landing.

In a robot having offset rotary joints according to the present invention, in order for independent control of the individual offset rotary joints to be easily implemented, a single offset rotary joint unit may be constituted by a first arm, a rotation correction arm that is driven in rotation about the axis of this first arm and a second arm that is driven in rotation about an axis obliquely intersecting this rotation correction arm, said first arm and said rotation correction arm being linked by means of a rotation correction joint mechanism section and said rotation correction arm and said second arm being linked by means of an offset rotary joint mechanism.

BRIEF DESCRIPTION OF THE DRAWINGS

FIG. 2 is a view given in explanation of a mode from parachute landing to operation according to the first embodiment;

FIG. 3 is a view given in explanation of a mode from rocket jet landing to operation according to the first embodiment;

FIG. 4 is a view given in explanation of a take-off mode at a location of good footing and a location of adverse footing according to the first embodiment;

FIG. 5 is a view given in explanation of modes for working with light objects and for working with heavy objects according to the first embodiment;

DESCRIPTION OF THE PREFERRED EMBODIMENTS

In order to implement diverse functions such as a self-righting mechanism when overturned and a take-off/landing function onto uneven ground, as well as a walking and running function and hand functions capable of performing three-dimensional tasks such as gripping, moving or accommodating objects that are demanded for planetary landing vehicles etc, according to the present invention, adaptation and application to a space robot leg mechanism of an arm type multi-joint robot in which offset rotary joints that were previously developed by the present inventors are linked was conceived.

Figure 10:
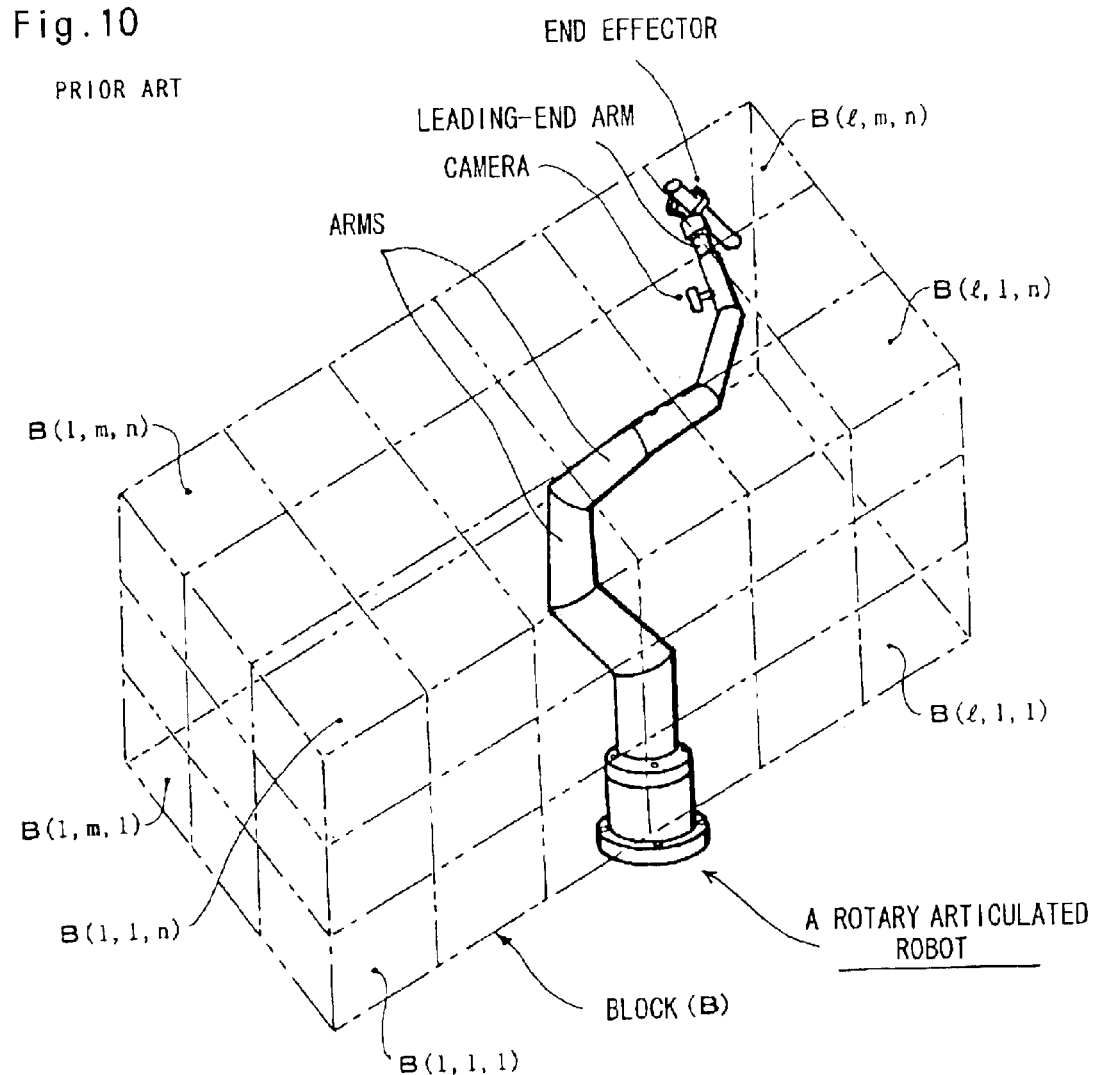
FIG. 10 is a view given in explanation of a multi-joint robot based on the present invention.

In this prior art, namely, "multi-joint robot and control method thereof" of Japanese Patent Publication No. 2001-138279, a highly functional multi-joint robot is obtained comprising offset rotary joints which provide high torque with small size and light weight and that is capable of executing complex and precise movement with a high payload. According to this proposal, the locus of movement is generated in a simple fashion and tasks can be performed smoothly with fast response even when complex movements must be executed. Its external shape is that of a multi-jointed structural body as shown in FIG. 10. Since a high gear ratio transmission/torque increase mechanism is adopted for the rotary transmission mechanism in the joints of the offset rotary joints, a motor of small size can be employed. Also, regarding the method of control, the operating regions of the end effectors are divided into a plurality of blocks and the operating conditions of each joint that are necessary to effect movement to a prescribed block are stored in database form for each block B. Teaching of operating points in a prescribed block region is converted into database form and a locus to a block in an operating region is generated using the block region data. Then, to reach a reference point in a block, the operation of the respective joints is determined by calling the data of the operating point in the block.

Figure 11:
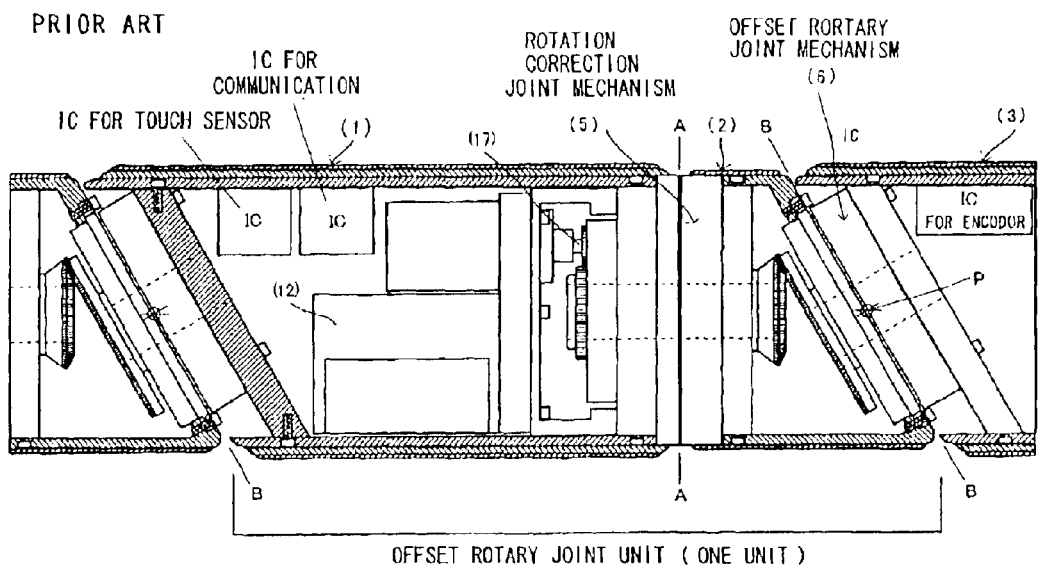
FIG. 11 is a view given in explanation of the construction of an offset rotary joint unit comprising a rotation correction function of a multi-joint robot.
Figure 12:
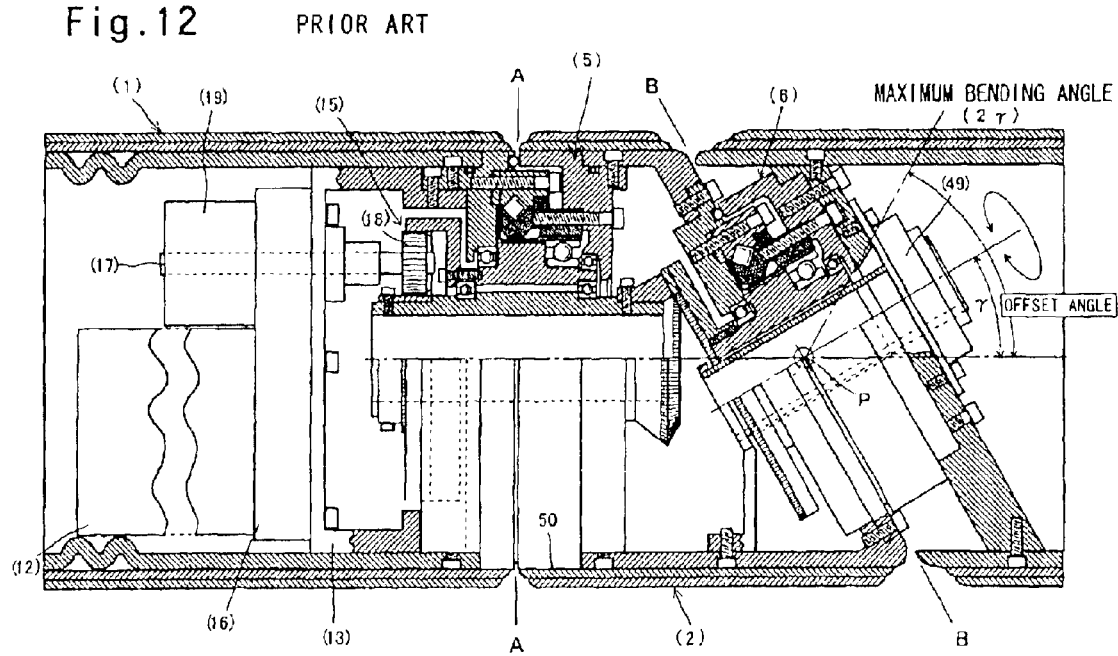
FIG. 12 is a view showing in partially sectioned mode a major part of an offset rotary joint unit set comprising a rotation correction function.

Japanese Patent Application 2001-211999 "Offset rotary joint unit fitted with a rotation correction mechanism" was additionally proposed in view of the complexity of the above method of operational control. As shown in FIG. 11, in this application, a single offset rotary joint unit (6) is constituted by a first arm (1), a rotation correction arm (2) that is driven in rotation about the axis of this first arm and a second arm (3) that is driven in rotation about an axis that obliquely intersects this rotation correction arm. The first arm (1) and the rotation correction arm (2) are linked by means of the rotation correction joint mechanism (5) and the rotation correction arm (2) and the second arm (3) are linked by means of the offset rotary joint mechanism (6). As shown in partial cross-section in FIG. 12, the rotation correction joint mechanism (5) and the offset rotary joint mechanism (6) are driven by means of a biaxial contra-rotating mechanism (15) by a common drive source. The advantages are thereby obtained that control is facilitated, minute operating lags can be eliminated and miniaturization of the assembled joint can be achieved. By contra-rotation of the rotation correction joint mechanism (5) accompanying the rotation of the offset rotary joint mechanism (6), two-dimensional bending action of the second arm (3) with respect to the first arm (1) can be achieved simply by a rotary mechanism. Preferably, the first arm (1), rotation correction arm (2) and the second arm (3) are respectively formed of hollow tubes and joint control units such as a motor (12), angle encoder (49), motor control circuit and communication circuit are integrally assembled in these hollow tubes. Signal leads etc may be arranged to be passed through passages in the rotation correction joint mechanisms (5) and the offset rotary joint mechanisms (6). Also, application to multiple rotation is possible by eliminating twisting of the power leads or signal leads by providing slip rings to transmit power or signals between the rotary bodies on the through-shafts of the angle encoders (49).

Figure 13:
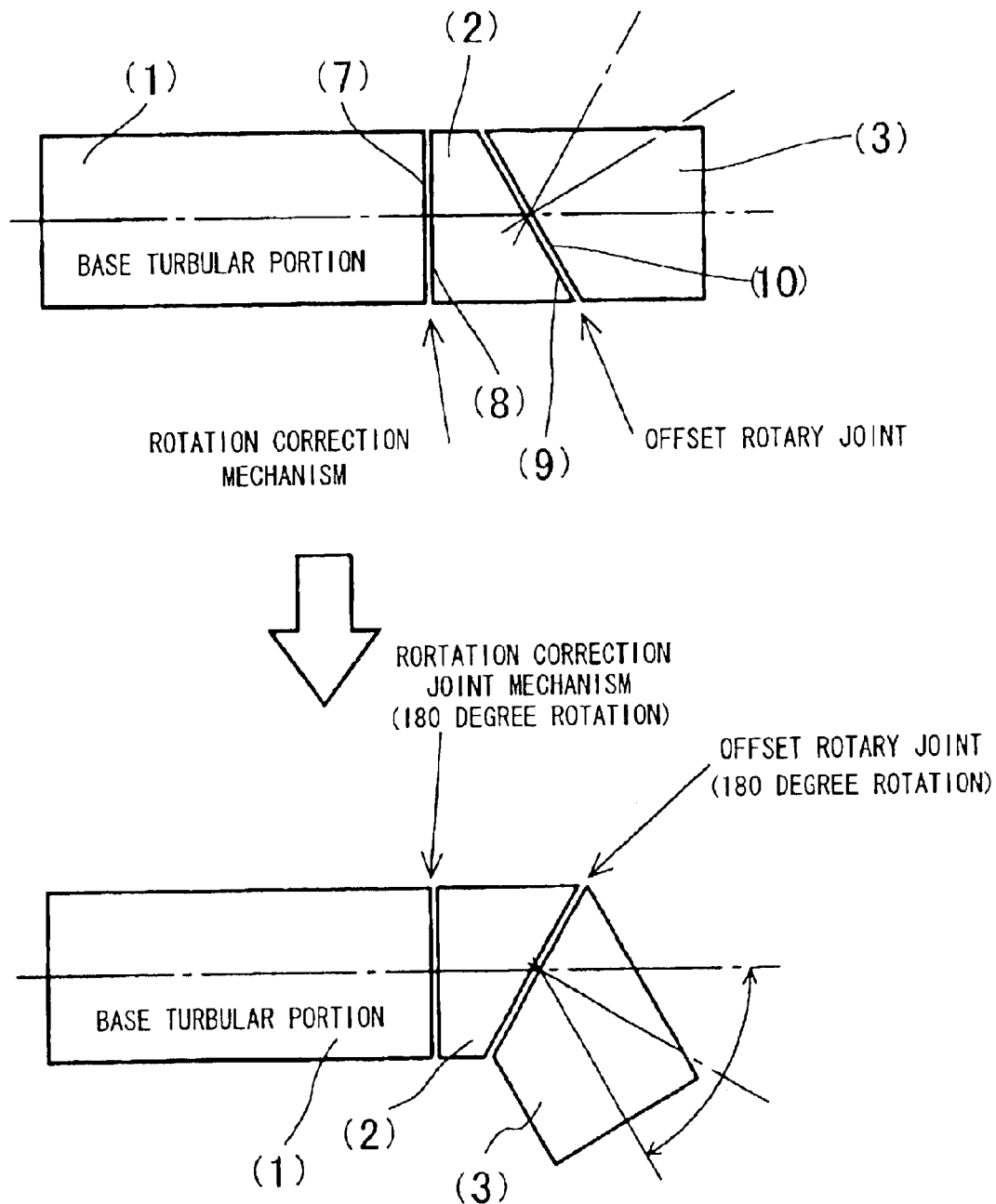
FIG. 13 is a view given in explanation of the action of an offset rotary joint unit of a multi-joint robot comprising a rotation correction function.

As shown diagrammatically in FIG. 13, the operation of such an offset rotary joint unit is that the leading end of the first arm (1) is provided with a right-angled face (7) that is sectioned at right angles with respect to the central axis while the base end of the rotation correction arm (2) is provided with a right-angled face (8) opposite to the right-angled face (7) of the first arm but whose leading end is provided with an inclined face (9) inclined (at 30° in the illustrated mode) with respect to the central axis. Also, the base end face of the second arm (3) is provided with an inclined face (10) opposite to the inclined face (9) of the rotation correction arm. The first arm (1) and the rotation correction arm (2) are linked through the rotation correction joint mechanism (5) with their right-angled faces (plane A—A) opposite and the rotation correction arm (2) and the second arm (3) are linked through the offset rotary joint mechanism (6) with their inclined faces (plane B—B) opposite. The rotation correction joint mechanism (5) and the offset rotary joint mechanism (6) are driven by a motor (servo motor in this embodiment) (12) constituting a common drive source. The motor (12) is fixed by means of a suitable mounting base (13) (FIG. 12) in the first arm (1) and drives in rotation the rotation correction joint mechanism (5) and the offset rotary joint mechanism (6), to which its output shaft is linked by means of a biaxial contra-rotation mechanism (15). A drive shaft (17) that is driven in rotation by the motor (12) by a suitable rotation transmission mechanism 16) is freely rotatably supported on the mounting base (13) and a gear wheel (18) of the biaxial contra-rotation mechanism is fixed at the leading end of this drive shaft. A suitable brake mechanism (19) such as an electromagnetic brake is provided at the base of the drive shaft (17) whereby when the arm is bent to a prescribed angle it can be held in this position and can then continue to be held in this position under high load by the action of this brake mechanism. A characteristic advantage of this rotation correction type offset joint is that the robot control operation is extremely straightforward, since, when an action of bending through a prescribed angle is performed at the joint, concurrently with the action of altering the direction of the leading end of the arm when a rotary adjustment is performed so that a desired angle is assumed, the amount of this alteration of direction is automatically cancelled by the rotation correction joint mechanism so that its effect is eliminated.

As the functions demanded for a robot according to the present invention, there may be envisioned a self-righting function when overturned, the ability to walk, the ability to run using wheels, the ability to mitigate impact on landing, the ability to function as a hand for performing collection of materials or other tasks, the ability to embrace heavy objects, the ability to maintain posture, the ability to freely direct a camera or sensor mounted on a leg in a desired direction and the provision of a self-repairing or self-compensating function in the event of malfunction. The basic structure of the robot according to the present invention comprises a rocket engine section for landing/take-off, a control section for controlling the robot and a communications device for communication with the Earth. It further comprises a main robot body providing space for accommodation of collected samples etc and three or more legs of the arm type applied to a multi-joint robot having a movement function, self-erecting function, posture maintaining function and manual task function. The leading ends of the legs, that provides the self-erecting, walking and running functions, on the opposite side to the base of the multi-joint robot of the type in which arms are connected to a main body have the form of disks or wheels adapted to the leg function. Thus, in a robot that performs hand functions of collecting materials or other tasks, a multi-joint robot of the arm type is provided of a form adapted to the other required functions such as a gripping function at the leading end thereof.

Figure 1:
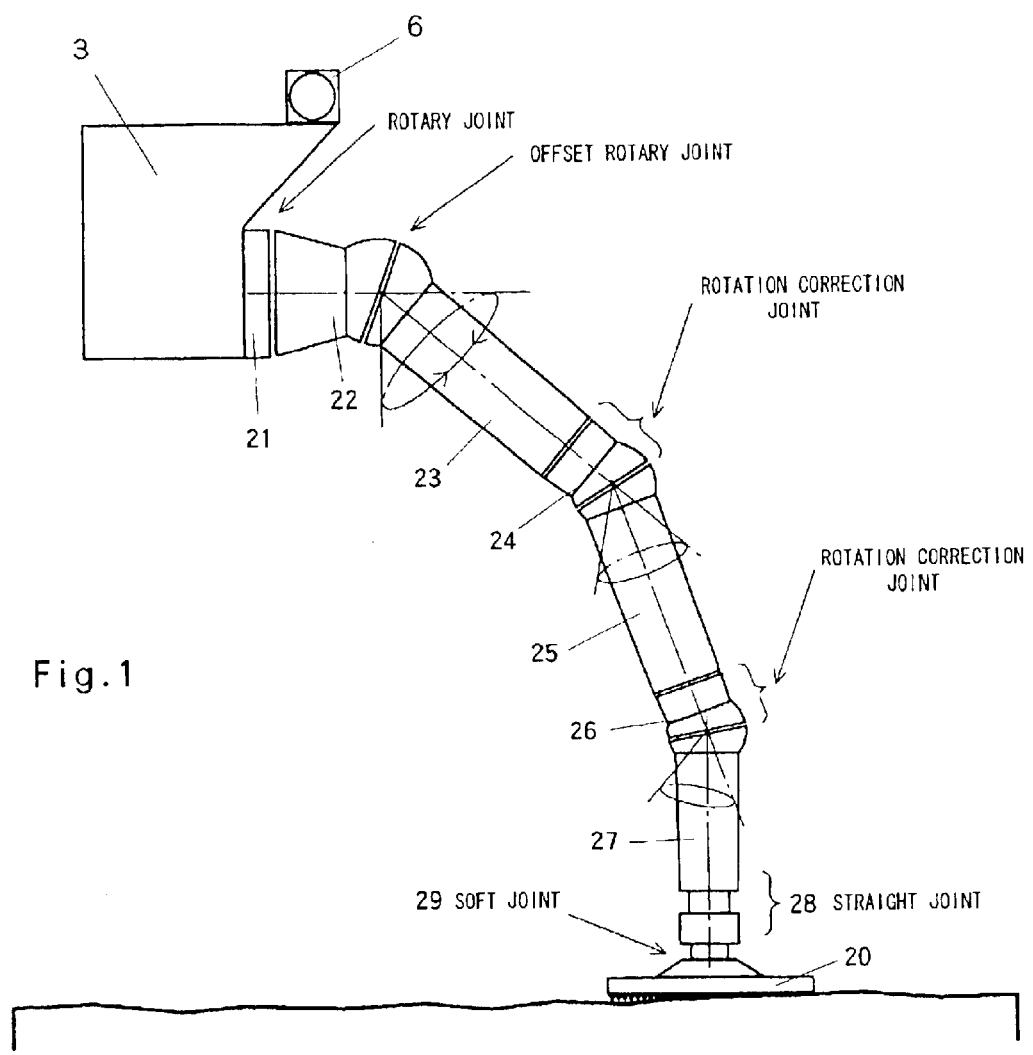
FIG. 1 is a view showing a typical example of arm-type multiple joints whereby offset rotary joints in a leg of a leg function in a robot according to the present invention are linked.

The construction of a robot leg according to the present invention adapted to an arm type multi-joint robot is described with reference to FIG. 1. 3 is a base on which the robot main body, here not shown, is placed and fixed; the root 21 of a leg of the multi-joint robot of the arm type is fixed to this base 3. There is a simple rotary joint between the base 21 which constitutes the fixing portion of this multi-joint robot of the arm type and the initial rotary arm 22 that is connected thereto and there is a simple offset joint between this and the first arm 23 connected at its leading end. A rotation correction arm 24 is connected with this first arm 23 and a second arm 25 that is driven in rotation about an axis that obliquely intersects this rotation correction arm 24 is mounted thereon; a single rotation correction offset joint unit is constituted by this first arm 23, the rotation correction arm 24 and the second arm 25. A further rotation correction offset joint unit is constituted by the rotation correction arm 26 at the leading end of this second arm 25 and a third arm 27 that is driven in rotation about an axis that obliquely intersects this rotation correction arm 26; at the leading end thereof, there is mounted a disk-shaped leading end ground-engaging member 20 by means of a flexible joint 29 having a cushioning function with a linear movement joint 28 that performs an extension/retraction function. The position and direction of the leading end ground-engaging member 20 with respect to the main body are largely determined by the rotary joint 21 and the offset joint 22; the positional relationship of the leading end ground-engaging member 20 with respect to the base fixed to the main body is adjusted and controlled by the first arm 23 to the third arm 27 and the linear movement joint 28 of the two rotation correction offset joint units therebetween. In the example illustrated, the three offset joints are all set at an angle of 30°. This is a typical example of multiple joints of the arm type wherein offset rotation joints in a leg of a leg function according to the present invention are connected and the multi-joint construction of an arm of the hand function is also based on this.

[Embodiment 1]

A first embodiment of a robot according to the present invention is shown in FIG. 2 and FIG. 3. The main robot body 1 consists of a polyhedron with a trunk of hexagonal pillar shape and whose top and bottom faces consist of hexagons which are smaller than the cross-section of the hexagonal pillar, and upper and lower inclined faces of hexagonal pyramidal shape joining the faces of the trunk and the top and bottom hexagonal faces, the top face being fitted with a parabolic antenna 12 and a space hatch 11 for accommodating collected samples and the lower face being fitted with the jet nozzle 13 of a rocket engine. The root of a multi-joint robot of a type having six arms is fixed to a base 3 for carrying and fixing the main robot body; of these six arms, four consist of legs 2 for performing a leg function and a pair of two arms constitute arms 4 for a hand function. The leading end ground-engaging member 20 for the leg function 2 is disk-shaped, suited for self-erecting or walking and the landing surface is of spiked form so as to resist sliding; the leading ends of the hand-function arms 4 are of shape constituting a pair of shallow "V's" having a holding function suitable for performing collection of materials and other tasks. Also, on this base 3, there are mounted four short feet 5 and three video-cameras 6 so that the robot is capable of self-erecting using these feet 5 in a flat region and so that the state of the environs of the robot can be ascertained using the video-cameras 6; in particular, these are installed such as to provide easy visibility forwards for traveling and downwards for collecting samples.

FIG. 2A shows the landing posture on parachute descent. This is not for use with a planetary robot but rather assumes a working robot in a location that is difficult for human beings to access; in the case of a planetary robot, typically, as shown in FIG. 3A, a soft landing is performed using a rocket back jet. Of course, parachute landing could be performed in the case of planets that have a gaseous layer. In both cases, during landing, the four legs 2 and the two legs 4 are all folded up so as to embrace the main body 1. Let us consider the case where, as a result of an attempted landing where the ground is not flat, the robot has not been able to stand up using the four feet 5 and has rolled over as shown in FIG. 2B. On ascertaining this situation from the information from the cameras 6, first of all as shown in FIG. 2C, the leg 2 on the side that is floating in the air is operated so that its leading end is brought into engagement with the surface of the ground. Next, the other legs are operated so as to perform a standing-up operation such that the main body 1 is supported by the four legs 2. A further operation is performed so that the main body 1 assumes a normal posture. This condition is shown in FIG. 2D. Travel to the working location is then effected after ascertaining the situation of the environs from the information of the cameras 6. This is done by performing a walking action of the robot. In this action, the position of the leading ground-engaging member 20 of the legs is sequentially advanced in the direction of advance whilst the center of gravity of the main body 1 of the robot standing on the four legs 2 that perform the leg function moves in the direction of advance. When the working location is reached, the assigned task, in this case, as shown by way of example in FIG. 2E, collection of a sample, is executed with the robot standing firmly on the four legs. The sample is collected using the two hand function arms 4; the sample is selected and gripped using the image information from the middle camera 6. This camera 6 is mounted so as to be freely rotatable in the upward and downwards directions and can perform observation in the forward direction and in the downward direction. When a sample has been collected, the hatch 11 in the upper face of the main body 1 is opened to enable the sample to be accommodated in the accommodating space. If the parabolic antenna 12 presents an obstacle to the tasks of opening the hatch 11 and performing the accommodation operation, the antenna position can be raised by extending a rod.

In the series of operations shown in FIG. 3, a soft landing is executed with a rocket back jet. The case is shown in which self-erection using the four short feet 5 has been achieved, since the landing location was flat. Specifically, FIG. 3A shows the condition immediately prior to landing and FIG. 3B shows the condition in which self-erection has been achieved using the four short feet 5 on landing. From this condition, in order to start work, as shown in FIG. 3C, the leading ends of the four legs 2 having a leg function are brought into engagement with the ground surface and the main body 1 is moved upwards whilst gradually narrowing the width of the legs, so that the main body is erected on the legs 2 as shown in FIG. 3D. In the same way as in the case of FIG. 2, further operation from this condition is to execute movement to the working location whilst ascertaining the condition of the environs from the information obtained by the camera 6. On reaching the working location, the assigned task, which in this case, by way of example, consists in collection of a sample as shown in FIG. 3E, is executed with the robot standing firmly on the four legs 2. The sample is collected using the two hand function arms 4; the sample is selected and gripped using the image information from the middle camera 6.

FIG. 4 shows an example of the mode on take-off after completion of the task. The case shown in FIG. 4A of the Figure is a case where take-off is effected from a flat location with good footing. The main body 1 is firmly supported in the normal posture with all of the four legs 2 for the leg function and the two arms 4 for the hand function engaging the ground surface. In this condition, the rocket engine is fired and the main body 1 takes off by separating from the base 3. The case shown in FIG. 4B is a case in which take-off takes place from an uneven, sloping location with adverse footing. The main body 1 is firmly supported in the normal posture with all of the four legs 2 for the leg function and the two arms 4 for the hand function engaging the ground surface. Even in the case of irregular, sloping ground, this is a case in which the functions of the present invention, employing an arm type multi-joint robot wherein offset rotary joints are linked that are capable of taking up suitable adjustment for distance and direction between the leg leading ends and the root of the base 3, can be exhibited to full advantage. Take-off is effected by separating the main body 1 from the base 3 by firing the rocket engine in this condition.

Next, the operation of sample collection using a robot according to the present invention is described with reference to FIG. 5. FIG. 5A in the Figure shows a gripping function using the shallow V-shaped leading ends of the pair of arms 4 for hand function in a mode for collecting comparatively small, lightweight samples; the sample is collected by a gripping and raising action and is conveyed to the accommodating space with the hatch open. FIG. 5B shows the mode used in collecting heavy samples; the sample is collected by embracing and raising it with the arm portions of the pair of arms 4 for hand function and is then transported to the prescribed location. In this case, while the sample might be accommodated in the robot's own accommodating space, it is also envisioned that it might be transported to another larger spacecraft. Thus it is possible to cope with working with large loads, which was not possible with a robot employing a conventional hinge mechanism, by means of the legs of the present invention using a multi-joint robot of the arm type in which offset rotary joints are linked.

[Embodiment 2]

Figure 6:
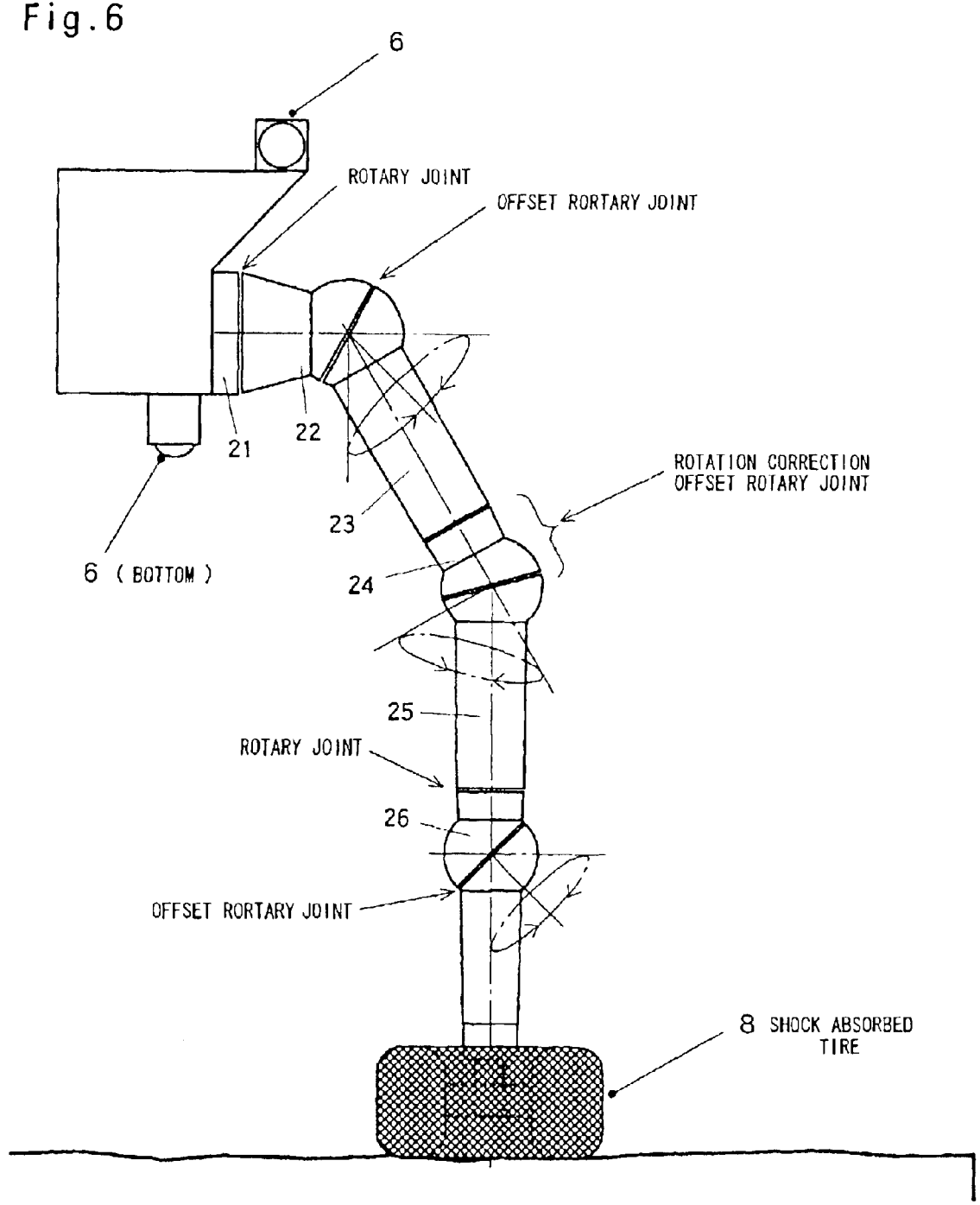
FIG. 6 is a view given in explanation of the construction of a leg for a leg mechanism according to a second embodiment of the present invention.
Figure 7:
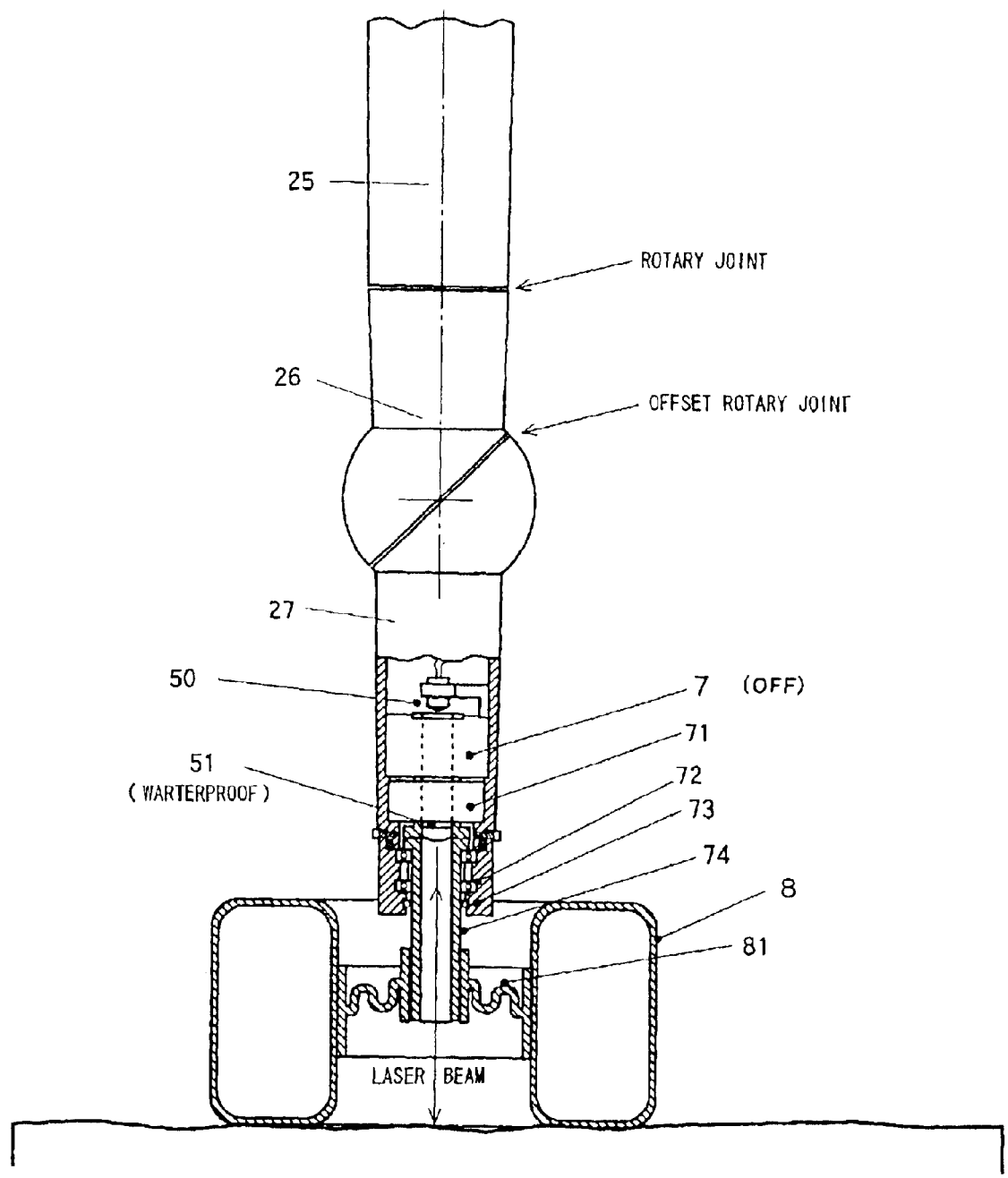
FIG. 7 is a partial cross-sectional view showing the construction of a major part of a leg for a leg mechanism according to the second embodiment of the present invention.
Figure 8:
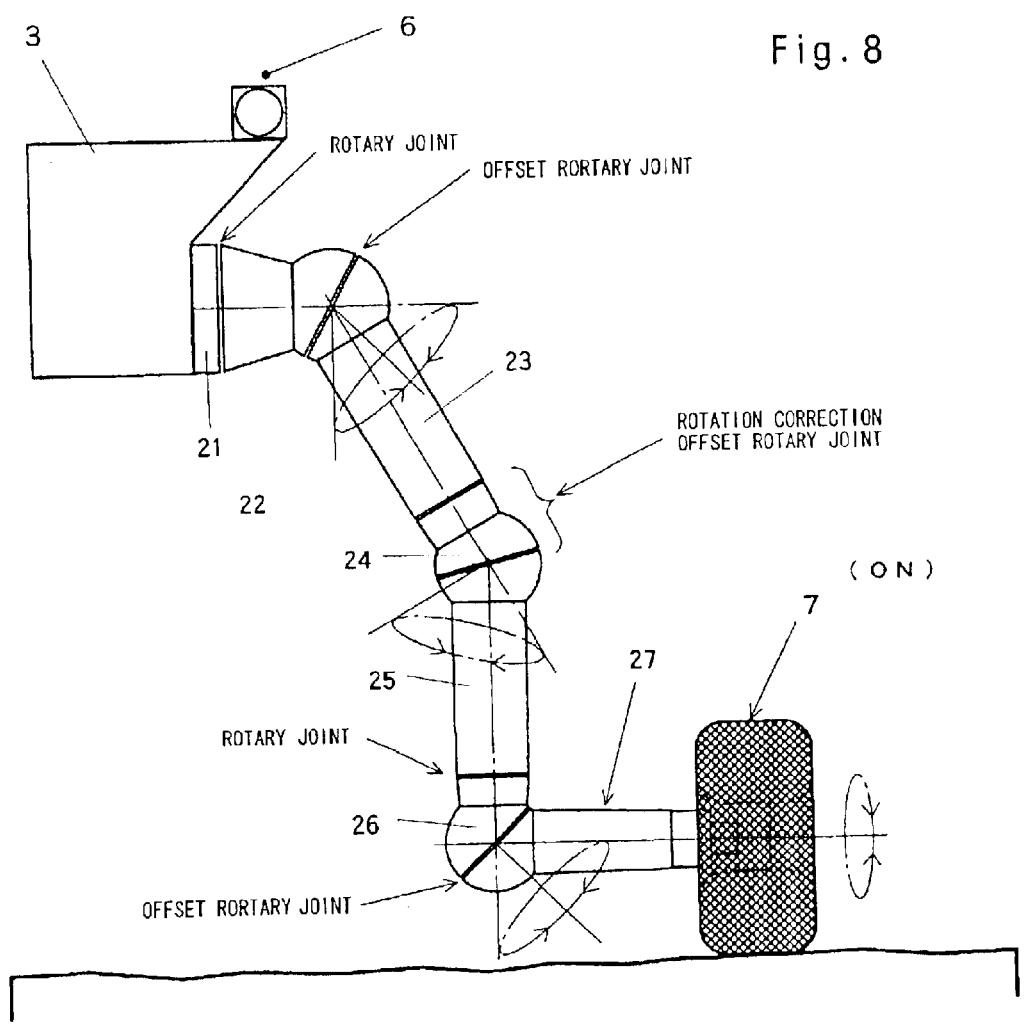
FIG. 8 is a view showing a running mode using a leg for a leg mechanism according to the second embodiment of the present invention.
Figure 9:
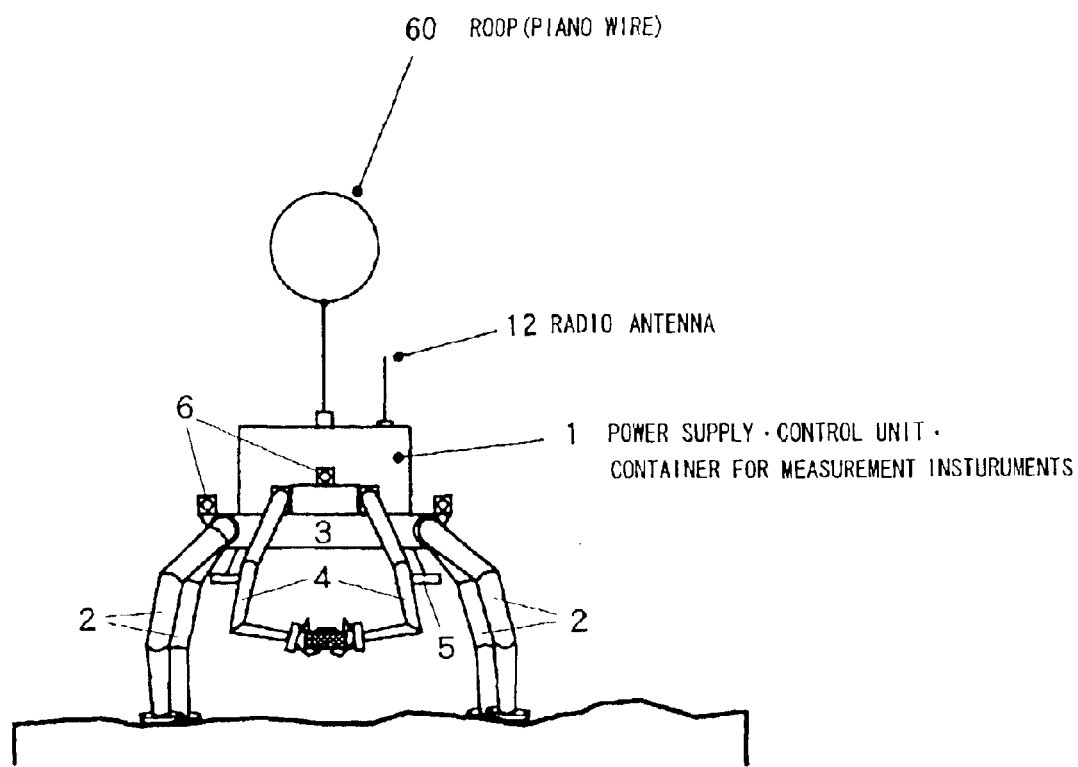
FIG. 9 is a view showing a third embodiment in which ground-based working is performed.

A second embodiment of the present invention is described with reference to FIG. 6 to FIG. 8. The aspect in which this embodiment differs from the preceding embodiment is the provision of a running mechanism in this embodiment. The main body 1 of the robot is unchanged. In FIG. 6, whereas 3 is a base where the main body 1 of the robot is placed and fixed and the root of the legs of an arm type multi-joint robot is fixed to this base 3, a simple rotary joint is constituted between the root 21, which is the fixing portion of this arm type multi-joint robot, and the initial arms 22 that are linked thereto and a simple offset joint is constituted between the initial arms 22 and the first arms 23 that are linked to the leading ends thereof. It is the same as the previous embodiment in that a rotation correction arm 24 is linked to this first arm 23 and a second arm 25 that is driven in rotation about an axis that obliuely intersects this rotation correction arm 24 is linked thereto, a single rotation correction offset joint unit being constituted by this first arm 23, a rotation correction arm 24 and second arm 25, and in that a further rotation correction offset joint unit is constituted by a further rotation correction arm 26 at the leading end of this second arm 25 and a third arm 27 that is driven in rotation about an axis that obliquely intersects this rotation correction arm 26. However, it differs in that the angle of the offset joint between the rotation correction arm 26 and the third arm 27 is set at 45°. Also, as shown in detail in FIG. 7, a vehicle drive motor 7 and a laser distance sensor 50 are accommodated in the third arm 27. At the leading end of this third arm 27, a tire 8 for performing a running function and a cushioning function when landing is rotatably mounted by means of a shock-absorbing spring 81, rotary shaft 74 and bearings 72. Also, the laser beam of the laser distance sensor 50 that is arranged in the third arm 27 is directed down an optical path constituted by the interior of the tube of the rotary shaft 74. In the rotary shaft 74, a lens 51 is mounted with a waterproof construction; at the leading end, within the third arm 27, the rotary shaft 74 is sealed by sealing material 73, so that the interior of the tube of the third arm 27 is of a liquid-tight structure.

In this embodiment constructed as above, when landing, the landing operation can easily be performed by performing a reverse firing operation of the rocket engine whilst using the laser distance sensor 50 directed towards the ground surface from the third arm 27 of the leg 2 for the leg function to measure the distance to the ground surface. This laser distance sensor 50 can also be used to ascertain and control the location of foot placement when performing a walking action and is particularly effective when walking over uneven ground that has a large number of irregularities. Also, as shown in FIG. 6 and FIG. 7, the landing shock can be absorbed by the damping action of the tire itself and the action of the shock-absorbing spring 81 by performing landing with the tire 8 in a horizontally arranged condition. If the robot overturns when landing, in the same way as in the preceding embodiment, a self-erecting operation can be performed by means of the four legs 2 for the leg function and the robot can move by a walking action in the same way as in the previous embodiment in locations of adverse footing. The angle of the offset joint at the leading end of the four legs 2 for the leg function being set at 45°, by rotating the joint between the rotation correction arm 26 and the third arm 27, as shown in FIG. 8, the tire 8 can be erected by making the third arm 27 horizontal, thereby putting it into a condition in which running as a wheel is possible. When in this condition the motor 7 driving the wheels is turned ON, the robot can perform running. Of course, turning can also be performed by controlling the direction of the tires. However, since the motive power source for this running is provided by the miniature wheel drive motor 7 arranged in the third arm 27, power is secured through a mechanism 71 of high reduction ratio such as a harmonic gear.

[Third embodiment]

Whereas the previous two embodiments envisioned chiefly a space robot, the presently illustrated embodiment is an embodiment of a robot envisioning terrestrial tasks. This is ideal as a robot for working in locations, albeit terrestrial, where there are geographically adverse conditions represented by deep holes or the bottom of valleys regions that it is difficult for human beings to enter such as for example deserts or deep forests, or for working in dangerous zones such as regions where toxic gases are generated or where there are radioactive substances. The construction in which four legs 2 for the leg function and a pair of arms 4 for the hand function, video cameras 6 and four short feet 5 are mounted on the base 3 is the same as in the case of the first embodiment. Since this is for terrestrial use, there is no need to provide a rocket engine in the main body and, instead, lowering or raising using a helicopter etc is envisioned; a strong wire such as piano wire may therefore be provided at the top of the main body or a recovery loop 60 may be fitted. Also, there is no need to use a parabolic antenna as the communication antenna 12 for communication with the command center and a simple antenna suffices. Also, since there is no need to separate from the main body on take-off, in this embodiment, the main body 1 and the base 3 have a completely fixed integral structure. Being a robot provided with legs 2f for the leg function and a pair of arms 4 for the hand function, it can execute tasks in a stable fashion in uneven regions of adverse footing in the same way as in the preceding embodiments.

Since the robot according to the present invention having offset rotary joints is a robot comprising a robot main body and at least three legs mounted on this main body, the legs having ground-engaging members mounted at their leading ends and comprising multi-joint arms wherein a plurality of offset rotary joints are linked, the legs are capable of independent three-dimensional movement drive control and so, as a result of combined movement of these legs, suitable three-dimensional movement can be achieved such as self-erecting operation of the main robot body or walking operation thereof, such as is required for a planetary landing vehicle or an extreme operations robot etc.

Also, thanks to the provision of multi-joint arms wherein a plurality of offset rotary joints are linked and at least two legs having a hand function, being fitted with finger members equipped with a gripping function at the leading ends of these arms, tasks involving gripping, raising and moving, that are demanded for a planetary landing vehicle etc or extreme operations robot can be performed. Thus, unlike conventional joints of a hinge-pin construction, these offset rotary joints comprise a function of self-holding in the same condition even when operation is stopped midway due to a fault etc. Thus, there is no possibility of very large forces being applied to the joints, such as in the case of bending at a large angle etc, and there is the advantage that special mechanisms for holding a condition are not required.

Furthermore, since a construction is adopted in which a rotary drive source is arranged in the outermost arm of each leg and wheels are mounted, with the aid of bearings and a rotary shaft, at the leading end of these arms, said rotary shaft being maintained in a horizontal condition by the offset joint and the wheels being capable of being rotated by the drive source, the robot can be given a running function such as is demanded for a planetary landing vehicle or extreme operations robot.

By mounting video-cameras and/or a distance sensor on the robot having offset rotary joints according to the present invention and utilizing the information obtained from these for control of the multi-joint arms wherein a plurality of offset rotary joints are linked, the various functions demanded for a planetary landing vehicle or extreme operations robot can easily be achieved.

Also, by making the wheels or ground-engaging members at the leading ends of the legs of a shock-absorbing construction, a robot such as a planetary landing vehicle or extreme operations robot can be protected from impact when landing.

Furthermore, with a robot comprising offset rotary joints according to the present invention, thanks to the adoption of a construction wherein a first offset rotary joint unit is constituted by a first arm, a rotation correction arm driven in rotation about the axis of this first arm and a second arm that is driven in rotation about an axis that obliquely intersects this rotation correction arm, said first arm and said rotation correction arm being linked through the rotation correction joint mechanism and said rotation correction arm and said second arm being linked through an offset rotary joint mechanism, when the various functions that are demanded for a planetary landing vehicle etc or extreme operations robot are executed, control of the individual offset rotary joints can be performed independently, so operations such as combined movement of the legs, which were extremely troublesome, can easily be performed.

What is claimed is:

1. A robot having offset rotary joints comprising a main robot body and at least three legs mounted on this main body, wherein each of the legs is constituted by a multi-joint arm having a plurality of offset rotary joints linked together and has a ground-engaging member mounted at the leading end thereof, and each leg is capable of independently controlled three-dimensional movement and drive, so that the robot body is capable of three-dimensional movement.

2. The robot having offset rotary joints according to claim 1, comprising at least two legs having a hand function, each of which is constituted by a multi-joint arm having a plurality of offset rotary joints linked together and has a finger member having a gripping function attached to the leading end thereof, so that the robot is capable of performing tasks.

3. The robot having offset rotary joints according to claim 2, wherein a rotary drive source is arranged on the outer arm of each leg, and a wheel is mounted by means of bearings and a rotary shaft at the leading end of the outer arm, so that said rotary shaft is held in a transverse condition by an offset joint and the wheel is rotated by said drive source to confer a running function on the robot.

4. The robot having offset rotary joints according to claim 2, wherein said tasks include gripping, raising and moving objects.

5. The robot having offset rotary joints according to claim 1, wherein a rotary drive source is arranged on the outer arm of each leg, and a wheel is mounted by means of bearings and a rotary shaft at the leading end of the outer arm, so that said rotary shaft is held in a transverse condition by an offset joint and the wheel is rotated by said drive source to confer a running function on the robot.

6. The robot having offset rotary joints according to claim 5, in which a video camera and/or distance sensor are mounted on the robot and information obtained therefrom is utilized for control of a multi-joint arm having a plurality of offset rotary joints linked together.

7. The robot having offset rotary joints according to claim 5, in which the wheels or ground-engaging members at the leading ends of the legs are made of a shock-absorbing construction in order to protect the robot from impact when landing.

8. The robot having offset rotary joints according to claim 5, wherein each of the offset rotary joints is constituted by an offset rotary joint unit consisting of a first arm, a rotation correction arm that is driven in rotation about the axis of this first arm and a second arm that is driven in rotation about an axis obliquely intersecting this rotation correction arm, said first arm and said rotation correction arm are linked by means of a rotation correction joint mechanism section, and said rotation correction arm and said second arm are linked by means of an offset rotary joint mechanism.

9. The robot having offset rotary joints according to claim 1, wherein a video camera and/or distance sensor are mounted on the robot and information obtained therefrom is utilized for control of a multi-joint arm having a plurality of offset rotary joints linked together.

10. The robot having offset rotary joints according to claim 9, in which a video camera and/or distance sensor are mounted on the robot and information obtained therefrom is utilized for control of a multi-joint arm having a plurality of offset rotary joints linked together.

11. The robot having offset rotary joints according to claim 9, in which the wheels or ground-engaging members at the leading ends of the legs are made of a shock-absorbing construction in order to protect the robot from impact when landing.

12. The robot having offset rotary joints according to claim 9, wherein each of the offset rotary joints is constituted by an offset rotary joint unit consisting of a first arm, a rotation correction arm that is driven in rotation about the axis of this first arm and a second arm that is driven in rotation about an axis obliquely intersecting this rotation correction arm, said first arm and said rotation correction arm are linked by means of a rotation correction joint mechanism section, and said rotation correction arm and said second arm are linked by means of an offset rotary joint mechanism.

13. The robot having offset rotary joints according to claim 1, wherein the wheels or ground-engaging members at the leading ends of the legs are made of a shock-absorbing construction in order to protect the robot from impact when landing.

14. The robot having offset rotary joints according to claim 13, in which the wheels or ground-engaging members at the leading ends of the legs are made of a shock-absorbing construction in order to protect the robot from impact when landing.

15. The robot having offset rotary joints according to claim 13, wherein each of the offset rotary joints is constituted by an offset rotary joint unit consisting of a first arm, a rotation correction arm that is driven in rotation about the axis of this first arm and a second arm that is driven in rotation about an axis obliquely intersecting this rotation correction arm, said first arm and said rotation correction arm are linked by means of a rotation correction joint mechanism section, and said rotation correction arm and said second arm are linked by means of an offset rotary joint mechanism.

16. The robot having offset rotary joints according to claim 1, wherein each of the offset rotary joints is constituted by an offset rotary joint unit consisting of a first arm, a rotation correction arm that is driven in rotation about the axis of this first arm and a second arm that is driven in rotation about an axis obliquely intersecting this rotation correction arm, said first arm and said rotation correction arm are linked by means of a rotation correction joint mechanism section, and said rotation correction arm and said second arm are linked by means of an offset rotary joint mechanism.

17. The robot having offset rotary joints according to claim 1, wherein said three-dimensional movement includes a self-erecting action or walking action by combined movement of the legs.

* * * * *